US011330420B2

(12) United States Patent
Li et al.

(10) Patent No.: US 11,330,420 B2
(45) Date of Patent: May 10, 2022

(54) WIRELESS LOCAL AREA NETWORK ROAMING METHOD AND COMMUNICATIONS APPARATUS

(71) Applicant: Huawei Technologies Co., Ltd., Shenzhen (CN)

(72) Inventors: Youtao Li, Suzhou (CN); Gang Su, Suzhou (CN); Wei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/809,220

(22) Filed: Mar. 4, 2020

(65) Prior Publication Data
US 2020/0288297 A1 Sep. 10, 2020

(30) Foreign Application Priority Data

Mar. 4, 2019 (CN) .......................... 201910159909.4

(51) Int. Cl.
*H04W 8/12* (2009.01)
*H04B 17/318* (2015.01)
(Continued)

(52) U.S. Cl.
CPC ............ *H04W 8/12* (2013.01); *H04B 17/318* (2015.01); *H04W 24/10* (2013.01); *H04W 40/244* (2013.01); *H04W 76/11* (2018.02)

(58) Field of Classification Search
CPC ... H04W 8/12; H04W 24/10; H04W 36/0058; H04W 36/08; H04W 36/0835;
(Continued)

(56) References Cited

U.S. PATENT DOCUMENTS 7,849,173 B1 * 12/2010 Uhlik ...................... H04L 12/14
709/223
9,479,990 B1 * 10/2016 Chen ............... H04W 36/00835
(Continued)

FOREIGN PATENT DOCUMENTS

CN 102833824 A 12/2012
CN 103686890 A 3/2014
(Continued)

OTHER PUBLICATIONS

CN/201910159909.4, Offie Action/Search Report, dated Aug. 9, 2021.

*Primary Examiner* — Jean A Gelin
(74) *Attorney, Agent, or Firm* — Leydig, Voit & Mayer, Ltd.

(57) ABSTRACT

A wireless local area network roaming method and a communications apparatus are provided, to improve a roaming effect of a terminal device in a wireless local area network. In the method, a control device selects, in place of a terminal device, an optimal roaming access point of the terminal device, to reduce a time consumed for determining the optimal roaming AP. After the optimal roaming access point of the terminal device is determined, an associated access point instructs the terminal device to attempt to roam to the optimal roaming access point. Because duration required for searching for the optimal roaming AP is reduced, a probability of data loss of the terminal device in a roaming process can be reduced, and a roaming effect of the terminal device in the wireless local area network is improved.

10 Claims, 7 Drawing Sheets

(51) Int. Cl.
*H04W 76/11* (2018.01)
*H04W 24/10* (2009.01)
*H04W 40/24* (2009.01)

(58) Field of Classification Search
CPC ... H04W 36/30; H04W 40/244; H04W 48/20; H04W 76/11; H04W 84/12; H04W 88/08; H04B 17/318
See application file for complete search history.

(56) References Cited

U.S. PATENT DOCUMENTS

| | | | |
|---|---|---|---|
| 9,538,446 B1 | 1/2017 | Kaushik | |
| 9,622,162 B1* | 4/2017 | Zhou | H04W 48/18 |
| 2004/0170191 A1* | 9/2004 | Guo | H04W 36/0088 370/468 |
| 2005/0119000 A1* | 6/2005 | Nasielski | H04W 8/02 455/433 |
| 2008/0037481 A1* | 2/2008 | Chiang | H04L 12/66 370/338 |
| 2009/0103503 A1* | 4/2009 | Chhabra | H04W 48/20 370/338 |
| 2011/0051640 A1* | 3/2011 | Ramesh | H04W 48/14 370/311 |
| 2011/0263255 A1* | 10/2011 | Alonso-Rubio | H04W 36/0005 455/436 |
| 2012/0099462 A1* | 4/2012 | Yuda | H04W 72/042 370/252 |
| 2013/0031615 A1* | 1/2013 | Woodward | H04W 12/084 726/4 |
| 2013/0178213 A1* | 7/2013 | Li | H04W 36/0088 455/436 |
| 2015/0038140 A1* | 2/2015 | Kilpatrick, II | H04W 72/02 455/436 |
| 2015/0156815 A1* | 6/2015 | Pang | H04L 45/48 370/338 |
| 2015/0162769 A1* | 6/2015 | Jestin | H01M 10/4257 320/137 |
| 2015/0181481 A1* | 6/2015 | Masini | H04W 36/0085 455/436 |
| 2015/0319661 A1* | 11/2015 | Jung | H04W 36/0085 455/436 |
| 2016/0088487 A1* | 3/2016 | Yu | H04W 16/14 370/329 |
| 2016/0112942 A1 | 4/2016 | Chang et al. | |
| 2016/0165529 A1* | 6/2016 | Jin | H04W 48/12 370/338 |
| 2016/0353320 A1* | 12/2016 | Hongo | H04W 28/0289 |
| 2017/0134255 A1* | 5/2017 | Amini | H04L 43/16 |
| 2019/0007172 A1* | 1/2019 | Sakai | H04L 1/0027 |
| 2019/0007969 A1* | 1/2019 | Shako | H04W 24/10 |
| 2019/0110237 A1* | 4/2019 | Cha | H04W 36/0083 |
| 2019/0182693 A1* | 6/2019 | Zhang | H04W 36/30 |
| 2019/0335376 A1* | 10/2019 | Huang | H04W 72/0426 |
| 2019/0349819 A1* | 11/2019 | Xu | H04W 36/0033 |
| 2020/0120557 A1* | 4/2020 | Zhang | H04W 36/00837 |
| 2021/0007021 A1* | 1/2021 | Kimba Dit Adamou | H04W 36/08 |

FOREIGN PATENT DOCUMENTS

| | | |
|---|---|---|
| CN | 103945434 A | 7/2014 |
| CN | 108235395 A | 6/2018 |
| WO | 2014178707 A2 | 11/2014 |
| WO | 2015154927 A1 | 10/2015 |

* cited by examiner

| Operating class | Channel number | Randomization interval | Measurement duration |
|---|---|---|---|

| Measurement mode | BSSID | Optional sub-element |
|---|---|---|

FIG. 3

| Measurement mode | Value of a measurement mode field |
|---|---|
| Passive mode | 0 |
| Active mode | 1 |
| Beacon table mode | 2 |
| Reserved mode | 3--255 |

WIRELESS LOCAL AREA NETWORK ROAMING METHOD AND COMMUNICATIONS APPARATUS

CROSS-REFERENCE TO RELATED APPLICATION

This application claims priority to Chinese Patent Application No. 201910159909.4, filed on Mar. 4, 2019, which is hereby incorporated by reference in its entirety.

TECHNICAL FIELD

This application relates to the field of communications technologies, and in particular, to a wireless local area network roaming method and a communications apparatus.

BACKGROUND

A wireless local area network (WLAN) may include a plurality of wireless access points (AP), and the plurality of APs may be configured to have a same service set identifier (SSID). A terminal device may roam between the plurality of APs in the WLAN, so that the terminal device can still maintain a connection to the network in a moving process.

When the terminal device reaches a set roaming condition due to impact of a mobile or an air interface environment, the terminal device detects an optimal roaming AP in a current environment, and roams from a currently connected AP (which may be referred to as an associated AP) to the determined optimal roaming AP.

When the terminal device reaches the set roaming condition and does not roam, the terminal device is already at a border of signal coverage of the associated AP. In this case, the terminal device may not accurately receive data sent by the associated AP. However, it takes a long time for the terminal device to detect the optimal roaming AP in the current environment. Consequently, data of the terminal device may be lost in a roaming process, and service experience is affected.

SUMMARY

Embodiments of this application provide a wireless local area network roaming method and a communications apparatus, to improve a roaming ability of a terminal device in a wireless local area network.

According to a first aspect, an embodiment of this application provides a wireless local area network roaming method. In the method, an associated access point, that is, an access point associated with a terminal device, first sends a measurement instruction including an identifier of the terminal device to a neighboring access point, and instructs, by using the measurement instruction, the neighboring access point to send measured signal strength of the terminal device to a control device. Then, the neighboring access point detects the signal strength of the terminal device, and sends the obtained signal strength of the terminal device to the control device. After obtaining the signal strength of the terminal device, the control device determines an optimal roaming access point of the terminal device based on the signal strength of the terminal device, and indicates the determined optimal roaming access point to the associated access point by using a roaming access point indication. After receiving the roaming access point indication, the associated access point sends a roaming instruction to instruct the terminal device to attempt to roam to the optimal roaming access point.

In the foregoing technical solution, the control device selects, in place of the terminal device, the optimal roaming access point of the terminal device, to reduce a time consumed for determining the optimal roaming access point. After the optimal roaming access point of the terminal device is determined, the associated access point instructs the terminal device to attempt to roam to the optimal roaming access point. Because duration required for searching for the optimal roaming access point is reduced, a probability of data loss of the terminal device in a roaming process can be reduced, and a roaming effect of the terminal device in a wireless local area network can be improved.

In a possible design, the associated access point further sends a beacon request when sending the measurement instruction, where a receiver address of the beacon request is an address of the terminal device, and a value of a measurement mode field of the beacon request is active.

In the foregoing technical solution, the associated access point may further send the beacon request at the same time when or almost at the same time when sending the measurement instruction, to ensure that the neighboring access point receives, in a time period for measuring the signal strength of the terminal device, a probe frame sent by the terminal device under trigger of the beacon request, and measures the probe frame to obtain the signal strength of a signal of the terminal device.

In a possible design, the associated access point repeatedly sends the beacon request, where lower signal strength of the terminal device indicates more frequent sending of the beacon request by the associated access node.

In the foregoing technical solution, the associated access point repeatedly sends the beacon request, so that the terminal device may repeatedly send the probe frame based on the beacon request, to ensure that the neighboring access point can receive the probe frame of the terminal device in the time period for measuring the signal strength of the terminal device, and obtain the signal strength of the terminal device based on the probe frame.

In addition, when the signal strength of the terminal device is lower, the associated access point may send the beacon request more frequently, so that the neighboring access point can receive a plurality of probe frames, and obtain the signal strength of the terminal device based on the plurality of probe frames, to ensure accuracy of the obtained signal strength of the terminal device.

In a possible design, the beacon request includes a channel list field, where the channel list field only includes an operating channel of the neighboring access point.

In the foregoing technical solution, in the roaming process, the terminal device usually selects the neighboring access point of the associated access point as the optimal roaming access point of the terminal device. Therefore, the associated access point may add the operating channel of the neighboring access point to the beacon request, so that the terminal device may need to scan only a channel indicated in the beacon request, and does not need to scan all channels. This can reduce duration required by the terminal device in a scanning process, and improve scanning efficiency.

In a possible design, the roaming access point indication carries an identifier of the optimal roaming access point and/or an identifier of an operating channel of the optimal roaming access point.

In the foregoing technical solution, after determining the optimal roaming access point of the terminal device, the control device may further indicate a roaming mode of the terminal device to the associated access point by adding different information to the roaming access point indication. For example, the control device may indicate, by adding only the identifier of the optimal roaming access point to the roaming access point indication, that the roaming mode of the terminal device is a channel switch announcement (CSA) manner. Alternatively, the control device may indicate, by adding the identifier of the optimal roaming access point and the identifier of the operating channel of the optimal roaming access point to the roaming access point indication, that the roaming mode of the terminal device is a basic service set transition management (BTM) manner. In this way, the control device does not need to send a roaming mode indication to the associated access point any more, and signaling overheads between the control device and the associated access point can be reduced.

According to a second aspect, a communications apparatus is provided. The communications apparatus includes a processor, configured to implement the method performed by the associated access point according to the first aspect. The communications apparatus may further include a memory, configured to store a program instruction and data. The memory is coupled to the processor. The processor may invoke and execute the program instruction stored in the memory, to implement any method performed by the associated access point according to the first aspect. The communications apparatus may further include a transceiver, where the transceiver is configured to implement communication between the communications apparatus and another device. For example, the another device is a control device.

In a possible design, the communications apparatus includes the processor and the transceiver, where the transceiver is configured to send, under the control of the processor, a measurement instruction to a neighboring access point, where the measurement instruction includes an identifier of a terminal device, the measurement instruction is used to instruct the neighboring access point to send measured signal strength of the terminal device to a control device, and an associated access point is an access point associated with the terminal device; the transceiver is configured to receive, under the control of the processor, a roaming access point indication sent by the control device, where the roaming access point indication is used to indicate an optimal roaming access point of the terminal device, and the optimal roaming access point is determined based on the signal strength of the terminal device that is sent by the neighboring access point; and the transceiver is configured to send, under the control of the processor, a roaming instruction, where the roaming instruction is used to instruct the terminal device to attempt to roam to the optimal roaming access point.

In a possible design, the transceiver is further configured to:

send a beacon request when sending the measurement instruction, where a receiver address of the beacon request is an address of the terminal device, and a value of a measurement mode field of the beacon request is active.

In a possible design, the transceiver is configured to repeatedly send, under the control of the processor, the beacon request, where lower signal strength of the terminal device indicates more frequent sending of the beacon request by the transceiver.

In a possible design, the beacon request includes a channel list field, where the channel list field only includes an operating channel of the neighboring access point.

In a possible design, the roaming access point indication carries an identifier of the optimal roaming access point and/or an identifier of an operating channel of the optimal roaming access point.

According to a third aspect, a communications apparatus is provided. The communications apparatus includes a processor, configured to implement the method performed by the control device according to the first aspect. The communications apparatus may further include a memory, configured to store a program instruction and data. The memory is coupled to the processor. The processor may invoke and execute the program instruction stored in the memory, to implement any method performed by the control device according to the first aspect. The communications apparatus may further include a transceiver, where the transceiver is configured to implement communication between the communications apparatus and another device. For example, the another device is an associated access point.

In a possible design, the communications apparatus includes the processor and the transceiver, where the transceiver is configured to receive, under the control of the processor, signal strength of a terminal device that is sent by a neighboring access point; the processor is configured to determine an optimal roaming access point of the terminal device based on the signal strength of the terminal device; and the processor is configured to control the transceiver to send a roaming access point indication to an associated access point, where the roaming access point indication is used to indicate the optimal roaming access point, and the associated access point is an access point associated with the terminal device.

In a possible design, the roaming access point indication carries an identifier of the optimal roaming access point and/or an identifier of an operating channel of the optimal roaming access point.

According to a fourth aspect, a communications apparatus is provided. The communications apparatus may be an associated access point, or may be an apparatus in the associated access point. The communications apparatus may include a processing module and a communications module. These modules may perform corresponding functions performed by the associated access point in any design example of the first aspect, and specifically:

the communications module is configured to: send, under the control of the processing module, a measurement instruction to a neighboring access point, where the measurement instruction includes an identifier of a terminal device, the measurement instruction is used to instruct the neighboring access point to send measured signal strength of the terminal device to a control device, and an associated access point is an access point associated with the terminal device;

the communications module is further configured to receive a roaming access point indication sent by the control device, where the roaming access point indication is used to indicate an optimal roaming access point of the terminal device, and the optimal roaming access point is determined based on the signal strength of the terminal device that is sent by the neighboring access point; and the communications module is further configured to send a roaming instruction, where the roaming instruction is used to instruct the terminal device to attempt to roam to the optimal roaming access point.

In a possible design, the communications module is further configured to:

send a beacon request when sending the measurement instruction, where a receiver address of the beacon request is an address of the terminal device, and a value of a measurement mode field of the beacon request is active.

In a possible design, the communications module repeatedly sends the beacon request, where lower signal strength of the terminal device indicates more frequent sending of the beacon request by the communications module.

In a possible design, the beacon request includes a channel list field, where the channel list field only includes an operating channel of the neighboring access point.

In a possible design, the roaming access point indication carries an identifier of the optimal roaming access point and/or an identifier of an operating channel of the optimal roaming access point.

According to a fifth aspect, a communications apparatus is provided. The communications apparatus may be a control device, or may be an apparatus in the control device. The communications apparatus may include a processing module and a communications module. These modules may perform corresponding functions performed by the control device in any design example of the first aspect, and specifically:

the communications module is configured to receive signal strength of a terminal device that is sent by a neighboring access point;

the processing module is configured to determine an optimal roaming access point of the terminal device based on the signal strength of the terminal device; and the transceiver module is further configured to send a roaming access point indication to an associated access point, where the roaming access point indication is used to indicate the optimal roaming access point, and the associated access point is an access point associated with the terminal device.

In a possible design, the roaming access point indication carries an identifier of the optimal roaming access point and/or an identifier of an operating channel of the optimal roaming access point.

According to a sixth aspect, an embodiment of this application further provides a computer-readable storage medium including an instruction. When the instruction is run on a computer, the computer is enabled to perform the method performed by the associated access point according to the first aspect.

According to a seventh aspect, an embodiment of this application further provides a computer-readable storage medium including an instruction. When the instruction is run on a computer, the computer is enabled to perform the method performed by the control device according to the first aspect.

According to an eighth aspect, an embodiment of this application further provides a computer program product including an instruction. When the computer program product is run on a computer, the computer is enabled to perform the method performed by the associated access point according to the first aspect.

According to a ninth aspect, an embodiment of this application further provides a computer program product including an instruction. When the computer program product is run on a computer, the computer is enabled to perform the method performed by the control device according to the first aspect.

According to a tenth aspect, an embodiment of this application provides a chip system. The chip system includes a processor, and may further includes a memory; and is configured to implement the method performed by the associated access point according to the first aspect. The chip system may include a chip, or may include a chip and another discrete component.

According to an eleventh aspect, an embodiment of this application provides a chip system. The chip system includes a processor, and may further includes a memory; and is configured to implement the method performed by the control device according to the first aspect. The chip system may include a chip, or may include a chip and another discrete component.

According to a twelfth aspect, an embodiment of this application provides a system. The system includes the communications apparatus according to the second aspect and the communications apparatus according to the third aspect.

According to a thirteenth aspect, an embodiment of this application provides a system. The system includes the communications apparatus according to the fourth aspect and the communications apparatus according to the fifth aspect.

For beneficial effects of the second aspect to the thirteenth aspect and the implementations of the second aspect to the thirteenth aspect, refer to descriptions of beneficial effects of the method and the implementations of the method according to the first aspect.

BRIEF DESCRIPTION OF DRAWINGS

FIG. 3 is a schematic diagram of a format of a beacon request according to an embodiment of this application;

FIG. 4 is a schematic diagram of a correspondence between a measurement mode and a value of a measurement mode field according to an embodiment of this application;

DESCRIPTION OF EMBODIMENTS

Figure 1:
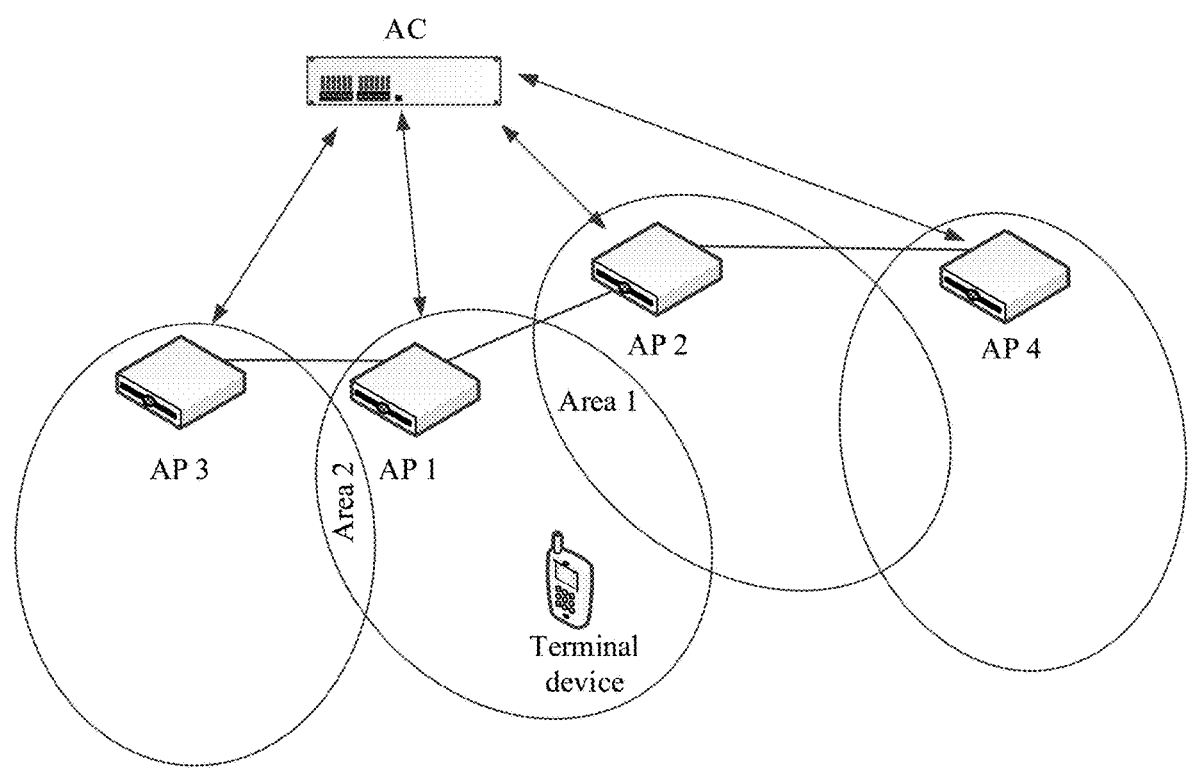
FIG. 1 is a schematic diagram of an example of a WLAN network architecture according to an embodiment of this application.

To make the objectives, technical solutions, and advantages of the embodiments of this application clearer, the following describes the technical solutions in the embodiments of this application in detail with reference to the accompanying drawings in this specification and specific implementations.

In the following, some terms in the embodiments of this application are described, to help a person skilled in the art have a better understanding.

(1) A terminal device, also referred to as a station (STA), may be a wireless communications chip, a wireless sensor, or a wireless communications terminal. For example, a mobile phone supporting a WLAN communications protocol, a tablet supporting a WLAN communications protocol, a set-top box supporting a WLAN communications protocol, a smart television supporting a WLAN communications protocol, an intelligent wearable device supporting a WLAN communications protocol, a vehicle-mounted communications device supporting a WLAN communications protocol, a computer supporting a WLAN communications protocol, a virtual reality (VR) device supporting a WLAN communications protocol, and an augmented reality (augmented reality, AR) device supporting a WLAN communications protocol.

(2) An access point (AP) is an apparatus that provides, by using a wireless medium, a distribution system access function (DSAF) for a terminal associated with the access point. The AP may further support functions such as routing, dialing, a dynamic host configuration protocol (DHCP), roaming, and load balancing. The AP may also be referred to as an access point, a hotspot, or the like. The AP is an access point through which a terminal device accesses a wired network, and is mainly deployed in a house, inside a building, and inside a campus, with a typical coverage radius of tens of meters to hundreds of meters. Certainly, the AP may also be deployed outdoors. That the terminal is associated with the AP may be understood as that a mapping between the AP and the terminal is established, and the terminal is allowed to invoke a distribution system service (DSS).

(3) A control device is responsible for controlling a plurality of APs. For example, the control device may work as an access controller (AC) in a Control And Provisioning of Wireless Access Points (CAPWAP) protocol. The control device may be an independent or integrated hardware device. For example, the control device may be a single server. The control device may alternatively be integrated in a switch or an AP.

(4) "A plurality of" in the embodiments of this application means two or more than two. In view of this, "a plurality of" in the embodiments of this application may also be understood as "at least two". "At least one" may be understood as one or more, for example, understood as one, two, or more. For example, "including at least one" means including one, two, or more, and does not limit which is included. For example, including at least one of A, B, and C may represent the following cases: A is included, B is included, C is included, A and B are included, A and C are included, B and C are included, or A and B and C are included. "And/or" describes an association relationship between associated objects and represents that three relationships may exist. For example, A and/or B may represent the following three cases: Only A exists, both A and B exist, and only B exists. The terms "system" and "network" may be used interchangeably in the embodiments of this application. Unless otherwise stated, in the embodiments of this application, ordinal numbers such as "first" and "second" are intended to distinguish between a plurality of objects, and not intended to limit a sequence, a time sequence, a priority, or importance of the plurality of objects.

The foregoing describes some concepts in the embodiments of this application, and the following describes technical features in the embodiments of this application.

After a terminal device is associated with an AP (that is, an associated AP) in a WLAN, because of movement of the terminal device, a roaming condition of the terminal device may be met. The roaming condition may be that signal strength of the terminal device is less than a preset threshold. For example, the roaming condition may be that signal strength of a signal received by the terminal device is less than −65 decibel milliwatts (dbm).

Then, the terminal device selects an optimal roaming AP from a plurality of APs, and roams to the determined optimal roaming AP.

The terminal device needs specific duration to determine the optimal roaming AP, and when the terminal device reaches the set roaming condition and does not roam, usually, the terminal device is already at a border of signal coverage of the associated AP. Therefore, the terminal device may not accurately receive data sent by the associated AP before finding the optimal roaming AP, so that data of the terminal device is lost in a roaming process, and service experience is affected.

In view of this, the embodiments of this application provides a wireless local area network roaming method. In the method, a control device selects, in place of the terminal device, an optimal roaming access point of the terminal device, to reduce a time consumed for determining the optimal roaming AP. After the optimal roaming access point of the terminal device is determined, an associated access point instructs the terminal device to attempt to roam to the optimal roaming access point. Because duration required for searching for the optimal roaming AP is reduced, a probability of data loss of the terminal device in a roaming process can be reduced, and a roaming effect of the terminal device in a wireless local area network is improved.

The following describes an application scenario of the embodiments of this application.

FIG. 1 is a schematic diagram of an example of a WLAN network architecture according to an embodiment of this application. In FIG. 1, four APs and a control device are included. The four APs are respectively an AP 1, an AP 2, an AP 3, and an AP 4. Signal coverage of the AP 1 overlaps signal coverage of the AP 2, as shown in an area 1 in FIG. 1. Signal coverage of the AP 1 overlaps signal coverage of the AP 3, as shown in an area 2 in FIG. 1. The terminal device is associated with the AP 1, to be specific, the AP 1 is an associated AP of the terminal device, and the terminal device is located in the signal coverage of the AP 1. It should be noted that the control device may be an independent hardware device shown in FIG. 1, or may be integrated into one of the AP 1 to AP 4 (which is not shown in the schematic diagram in this embodiment of this application). A specific form of the control device is not limited in this embodiment of this application.

The plurality of APs may be connected in a wired manner. For example, the AP 1 may be connected to the AP 2 through a router by using a wired cable, or the AP 1 and the AP 2 may be directly connected by using a wired cable. A connection mode between the AP 2 and the AP 3 and a connection mode between the AP 3 and the AP 4 are the same as the connection mode between the AP 1 and the AP 2, and details are not described herein again. In FIG. 1, an example in which the plurality of APs are directly connected by using wired cables is used. The plurality of APs may be connected to the control device in a wireless or wired manner, and the plurality of APs may be directly connected to the control device, or may be connected to the control device by using a device such as a switch or a gateway. A specific connection mode is not limited in this embodiment of this application.

It should be noted that quantities of APs, control devices, and terminal devices in FIG. 1 are merely examples. In actual application, the WLAN network architecture provided in this application may provide services for more terminal devices, and may include more APs. In addition, in the WLAN network architecture shown in FIG. 1, although the APs, the control device, the terminal device, and a cloud management platform are shown, the WLAN network architecture may not be limited to including the foregoing content. For example, the WLAN network architecture may further include a device that is configured to carry a virtualized network function, a wireless relay device, a switch, a router, and the like. These are clear for a person of ordinary skill in the art. Details are not described herein.

The following describes the technical solutions provided in the embodiments of this application with reference to the accompanying drawings.

Figure 2:
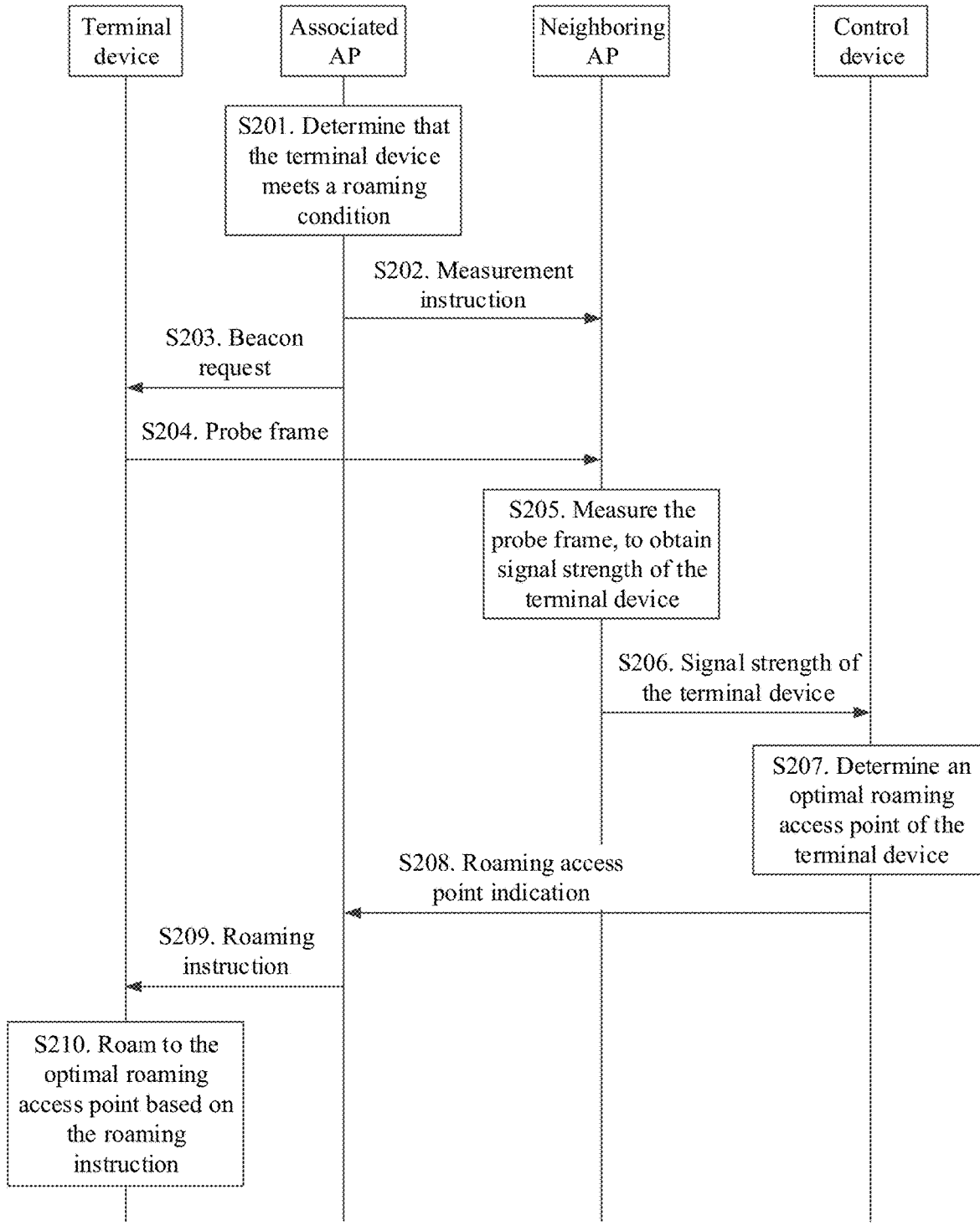
FIG. 2 is a flowchart of an example of a wireless local area network roaming method according to an embodiment of this application.

An embodiment of this application provides a wireless local area network roaming method. FIG. 2 is a flowchart of the method.

In the following description process, an example in which the method is applied to the WLAN network architecture shown in FIG. 1 is used. In other words, an associated access point described below may be the AP 1 in the WLAN network architecture shown in FIG. 1, a terminal device described below may be the terminal device in the WLAN network architecture shown in FIG. 1, a control device described below may be the control device in the WLAN network architecture described in FIG. 1, and a neighboring AP described below may be one or more of the AP 2 and AP 3 in the WLAN network architecture described in FIG. 1.

For ease of description, an example in which the method is performed by the AP 1, the control device, and the terminal device is used below.

S201. The associated access point determines that the terminal device meets a roaming condition.

After the terminal device accesses the AP 1 in the WLAN network shown in FIG. 1, due to factors such as mobility of the terminal device, air interface quality, and instability of network quality, the terminal device may need to roam to another access point, to obtain a better network service, so that the AP 1 may determine whether the terminal device meets the roaming condition.

In this embodiment of this application, the roaming condition may be that signal strength of a signal that is of the terminal device and that is received by the associated AP is less than a threshold. In an example, the signal strength of the terminal device may be represented by a parameter such as a signal-to-noise ratio (SNR) or a received signal strength indication (RSSI).

The threshold may be a preset fixed value, and the threshold may be specific to all terminal devices. In other words, when signal strength of a signal of any terminal device is less than the threshold, it is determined that the terminal device meets the roaming condition. For example, when the SNR is used to indicate the signal strength of the terminal device, the threshold may be 40 dB, 60 dB, or the like. When the RSSI is used to indicate the signal strength of the terminal device, the threshold may be indicated by any digit from 0 to 255. There is a preset object relationship between a digit and a value of the RSSI. For example, a digit 0 indicates that a value of the RSSI is −10 dbm, a digit 1 indicates that a value of the RSSI is −20 dbm, a digit 3 indicates that a value of the RSSI is −30 dbm, and the rest may be deduced by analogy. When a value of the threshold is 6, it actually means that a value of the RSSI is −60 dbm. Alternatively, a threshold may be set for each terminal device. For example, when the SNR is used to indicate the signal strength of the terminal device, a threshold corresponding to a terminal device may be −60 dB, and a threshold corresponding to another terminal device may be −70 dB. Certainly, the preset threshold may alternatively be determined in another manner.

The roaming condition is not limited in this embodiment of this application. For ease of description, an example in which the roaming condition is that the signal strength of the terminal device is less than the preset threshold is used below for description.

After the terminal device accesses the AP 1, the AP 1 measures the signal strength of the terminal device. To reduce load of the AP 1, the AP 1 may be configured to periodically detect the signal strength of the terminal device, and a period may be 2 s, 5 s, 10 s, or the like. After the AP 1 determines that a measurement result of the signal strength of the terminal device is less than the preset threshold, the AP 1 determines that the terminal device meets the roaming condition.

It should be noted that in the WLAN architecture shown in FIG. 1, there is only one terminal device that accesses the AP 1. However, in actual use, a same AP may allow a plurality of terminal devices to access at the same time. Therefore, when a plurality of terminal devices access the AP 1, the AP 1 needs to measure the signal strength of each terminal device, and determine whether each terminal device meets the roaming condition.

S202. The associated access point sends a measurement instruction to a neighboring access point, and the neighboring access point receives the measurement instruction.

In this embodiment of this application, the measurement instruction includes an identifier of the terminal device, and the measurement instruction is used to instruct the neighboring access point to send the measured signal strength of the terminal device to the control device.

In this embodiment of this application, the identifier of the terminal device may be information such as an address, an index number, a registration name, or a registration code that are of the terminal device. This is not limited herein.

In an example, the measurement instruction can include an identifier of only one terminal device. For example, if the AP 1 determines that only one terminal device meets the roaming condition, the measurement instruction includes an identifier of the only one terminal device. For another example, when the AP 1 determines that at least two of a plurality of terminal devices connected to the AP 1 meet the roaming condition, the AP 1 may generate a measurement instruction corresponding to each of the at least two terminal devices, that is, generate at least two measurement instructions, and each measurement instruction includes an identifier of one of the two terminal devices.

In another example, the measurement instruction may include an identifier of the at least one terminal device. In this way, when determining that at least two terminal devices each meet the roaming condition, the AP 1 may add identifiers of the at least two terminal devices to one measurement instruction, and therefore, the measurement instruction is used to instruct the neighboring AP to measure signal strength of each of the at least two terminal devices, so that signaling overheads between the AP 1 and the neighboring AP can be reduced.

A manner of sending the measurement instruction to the neighboring access point by the AP 1 may include but is not limited to the following three types.

A First Sending Manner:

After a WLAN network is deployed, each access point may learn of information about a neighboring access point of each access point, for example, may obtain an address of the neighboring access point of each access point, for example, a media access control (MAC) address, by using the control device. Then, the AP 1 may send the measurement request to the neighboring access point of the AP 1 in a unicast manner by using a wired network between the APs.

A Second Sending Manner:

The AP 1 may alternatively send the measurement request to the neighboring access point of the AP 1 in a multicast or broadcast manner by using the wired network between the APs. For example, the AP 1 may add an address of the neighboring access point to payload of the measurement request. Because the measurement request is sent in a multicast manner, all of the plurality of APs can receive the measurement request. After receiving the measurement request, each AP determines whether the measurement request includes an address of the AP. If the address of the AP is not included, the AP discards the measurement request. For another example, the measurement request does not carry the address of the neighboring access point. After receiving the measurement request, each AP determines whether an AP to which a source address of the measurement request belongs is a neighboring AP of the AP. If a sender of the measurement request is not the neighboring AP of the AP, the AP discards the measurement request.

A Third Sending Manner:

The AP 1 may alternatively not need to learn of the information about the neighboring access point of the AP 1. The AP 1 sends a first measurement request including the identifier of the terminal device to the control device. After receiving the measurement request, the control device first determines that neighboring APs of the AP 1 are the AP 2 and the AP 3, and then sends a second measurement request including the identifier of the terminal device to the AP 2 and the AP 3.

Certainly, the measurement instruction may alternatively be sent in another manner. In this embodiment of this application, for ease of description, an example in which the AP 1 generates and sends the measurement instruction is used for description.

S203. The associated access point sends a beacon request, and the terminal device receives the beacon request.

After determining that the terminal device meets the roaming condition, the AP 1 may send the beacon request (beacon request) by using an air interface. A receiver address of the beacon request is the address of the terminal device. In this way, the terminal device may receive the beacon request on the air interface.

In addition, in this embodiment of this application, the beacon request is used to instruct the terminal device to scan, after receiving the beacon request, a channel by sending a probe frame. In other words, the measurement process is triggered by actively sending the probe frame by the terminal device, so that the beacon request further needs to indicate that a measurement mode of the terminal device is an active mode. In this way, after receiving the beacon request, the terminal device sends the probe frame on the channel that needs to be scanned.

The following describes a sending time at which the AP 1 sends the beacon request.

In step S202, the measurement instruction sent by the AP 1 is used to instruct the neighboring AP to send the measured signal strength of the terminal device to the control device, in other words, the neighboring AP measures the signal strength of the terminal device after a moment of receiving the measurement instruction. Only after receiving a signal of the terminal device, the neighboring AP can measure signal strength of the signal. To increase a possibility of sending the signal by the terminal device during the measurement, the AP 1 sends the beacon request to trigger the terminal device to send the probe frame. After the terminal device sends the probe frame, the neighboring AP may measure signal strength of the probe frame.

Therefore, step S202 and step S203 need to be performed at the same time, or a difference between moments at which step S202 and step S203 are separately performed is less than a preset time difference. The preset time difference may be relatively short duration, for example, 2 s or 1s. Alternatively, if in step S202, the measurement instruction is further used to indicate that the neighboring AP needs to send the measurement result to the control device within a preset time period (for example, 2 s), the difference between the moments at which step S202 and step S203 are separately performed is less than the preset time period.

The following describes a sending manner of sending the beacon request by the AP 1.

In this embodiment of this application, the associated access point may repeatedly send the beacon request. Lower signal strength of the terminal device indicates more frequent sending of the beacon request by the associated access node, so that the terminal can perform scanning more frequently. Therefore, the neighboring AP obtains more measurement results of the signal strength of the terminal device, and accuracy of the measurement result of the signal strength of the terminal device is ensured.

In an example, in step S201, when the AP 1 determines, by measuring the signal strength of the terminal device, whether the terminal device meets the roaming condition, the AP 1 may further obtain a difference between the measured signal strength of the terminal device and the preset threshold, and therefore, lower signal strength of the terminal device may be understood as: If the difference is relatively large, the signal strength of the terminal device is lower.

In this case, a correspondence between a difference range and a sending period of the beacon request may be preset in the AP 1. For example, three difference ranges are set. A first difference range is from 0 dbm to 5 dbm, a second difference range is from 6 dbm to 10 dbm, and a third difference range is from 11 dbm to 15 dbm. A sending period of the beacon request corresponding to the first difference range is 200 milliseconds (ms), a sending period of the beacon request corresponding to the second difference range is 100 ms, and a sending period of the beacon request corresponding to the third difference range is 50 ms.

In this way, after obtaining the difference between the signal strength of the terminal device and the preset threshold, the AP 1 may determine, in the three difference ranges, a difference range in which the difference is located. For example, if the difference between the signal strength of the terminal device and the preset threshold is 6 dbm, the AP 1 determines that the difference is located in the second difference range, so that the sending period of the beacon request is determined as 100 ms.

In another example, in step S201, when the AP 1 determines, by measuring the signal strength of the terminal device, whether the terminal device meets the roaming condition, the AP 1 may further obtain a value of a derivative of the signal strength of the terminal device with respect to a time. The derivative of the signal strength with respect to a time indicates a speed at which the signal strength decreases. Lower signal strength of the terminal device may be understood as: If the value of the derivative is smaller, the signal strength of the terminal device is lower.

In this case, a correspondence between a value range of the derivative and a sending period of the beacon request may be preset in the AP 1. For example, three value ranges of the derivative are set. A first value range of the derivative is from 0 dbm/ms to −5 dbm/ms, a second value range of the derivative is from −6 dbm/ms to −10 dbm/ms, and a third value range of the derivative is less than or equal to −11 dbm/ms. And a sending period of the beacon request corresponding to each value range of the derivative is set. If the derivative of the signal strength is greater than 0 dbm/ms, the signal of the terminal is enhanced. Therefore, roaming is not required.

In this way, after obtaining the value of the derivative of the signal strength of the terminal device with respect to a time, the AP 1 may determine the sending period of the beacon request.

The signal strength of the terminal device may alternatively be represented by using another parameter. This is not limited herein.

The following describes a specific format of the beacon request.

FIG. 3 is a schematic diagram of a format of a beacon request. As shown in FIG. 3, the beacon request includes the following seven fields.

1. An operating class is used to indicate an operating class of a channel group to which the beacon request is applicable.

2. A channel number is used to indicate a channel used by the beacon request.

3. A randomization interval is used to indicate an upper limit of a random delay to be used before measurement is performed. It may be understood that, after receiving the beacon request, the terminal device needs to start the measurement as soon as possible within duration indicated by the randomization interval field.

4. Measurement duration is used to indicate duration of scanning each channel by the terminal device. A value of the field may be set to 100 time units (time unit, TU), each TU may be 1.024 ms, and a value of the field may also be set to a value less than 100 TUs. This is not limited herein.

5. A measurement mode is used to indicate a mode in which the terminal device scans the channel. Referring to FIG. 4, there may be four measurement modes, and the four measurement modes are respectively: a passive mode, an active mode, a beacon table mode, and a reserved mode. That a value of the field is 0 is used to indicate that the measurement mode is the passive mode, that a value of the field is 1 is used to indicate that the measurement mode is the active mode, that a value of the field is 2 is used to indicate that the measurement mode is the beacon table mode, and that a value of the field is greater than 2 is used to indicate that the measurement mode is the reserved mode.

It can be learned from the foregoing content that, in this embodiment of this application, the value of the measurement mode field may be set to a value corresponding to the active mode.

6. A basic service set identifier (BSSID) is used to indicate an identifier of a WLAN in which the AP 1 is located, and when a beacon report corresponding to the beacon request is fed back, an ID indicated by the BSSID field should be carried.

7. An optional subelement may include other information, for example, may include an SSID, an extended request, information about whether to send a beacon report, and the like, and this is not listed one by one herein.

For a meaning of each field, refer to section 9.4.4.21.7 of the institute of electrical and electronics engineers (IEEE) 802.11-2016 protocol, and related content of the beacon request is not described herein again.

In a possible implementation, a channel list field may be added to the optional sub-element field, where the channel list field includes only an operating channel of the neighboring access point.

In an example, after the WLAN is deployed, the control device may control each AP to obtain BSSID information of a surrounding AP through scanning, and then report the scanned basic service set identifier (BSSID) to the control device. The control device determines, based on the BSSID reported by each AP, a neighboring AP corresponding to each AP and an operating channel of the neighboring AP, to generate a neighboring AP channel set corresponding to each AP, and sends the neighboring AP channel set corresponding to each AP to a corresponding AP. For example, the control device may determine, based on BSSIDs reported by the AP 2 and the AP 3, that a neighboring AP channel set of the AP 1 includes an operating channel of the AP 2 and an operating channel of the AP 3, and when the AP 1 sends the beacon request to the terminal device, the neighboring AP channel set of the AP 1 may be filled in the optional sub-element field. In this way, after receiving the beacon request, the terminal device may scan only a neighboring channel indicated in the optional sub-element field, so that a quantity of channels that the terminal device needs to scan can be reduced, thereby reducing time overheads of scanning the channels by the terminal device.

It should be noted that the beacon request may not include the channel list field, and in this case, it may be implicitly indicated that the terminal device needs to scan all channels.

In addition, it should be noted that S203 is an optional step, in other words, S203 does not necessarily need to be performed. In an example, if a frequency of the operating channel of the AP 1 is the same as a frequency of the operating channel of the neighboring APs (AP 2 and AP 3), all signals (for example, signals that carry data of the terminal device) sent by the terminal device can also be received by the neighboring APs. In this case, the AP 1 may not send the beacon request. The beacon request is used to instruct the terminal device to send the probe frame to perform channel scanning. Therefore, when the terminal device does not receive the beacon request, the terminal device does not send the probe frame to the neighboring AP. In this way, after receiving the measurement request sent by the AP 1, the neighboring AP may measure any signal sent by the terminal device, for example, measure a signal carrying data of the terminal device (which may also be referred to as a data signal) that is sent by the terminal device, to obtain the signal strength of the terminal device. Alternatively, a plurality of data signals sent by the terminal device may be measured, an average value of measurement results of the plurality of data signals is calculated, and the average value is used as the signal strength of the signal of the terminal device. Alternatively, the AP 1 may not send the beacon request, but sends any signal to the terminal device in a unicast manner. The signal may be a control frame or a data frame, or may be an empty packet with only a header and without data. After receiving the signal, the terminal device feeds back a response signal to the AP 1, and the neighboring AP may also obtain the signal strength of the signal of the terminal device by measuring the response signal.

In FIG. 2, an example in which step S203 is performed is used for description. In FIG. 2, step S203 is represented by a solid line.

S204. The terminal device sends the probe frame to perform channel scanning, and the neighboring access point receives the probe frame.

After receiving the beacon request sent by the AP 1, the terminal device obtains, by parsing the beacon request, an operating channel of the neighboring AP that is indicated in the beacon request, for example, an operating channel of the AP 2 and an operating channel of the AP 3. Then, the probe frame is sequentially sent on each channel to perform an operation. Specifically, the terminal device first sends the probe frame on the operating channel of the AP 2, starts a timer, and records duration of scanning the operating channel of the AP 2 by the terminal device. When the duration of the scanning reaches measurement duration indicated in the beacon request, the terminal device switches to an operating channel of another AP that is indicated by the beacon request for performing scanning, for example, switches to the operating channel of the AP 3 for performing scanning, until scanning on the operating channels of all the neighboring APs that are indicated in the beacon request is completed.

S205. The neighboring access point measures the probe frame, to obtain the signal strength of the terminal device.

When receiving the probe frame sent by the terminal device, the AP 2 and the AP 3 measure the probe frame, and a measurement result is used as the signal strength of the terminal device that is obtained by the AP.

It should be noted that, because the terminal device scans the channels in sequence, if the terminal device first scans the operating channel of the AP 2 and then scans the operating channel of the AP 3, the AP 2 obtains the signal strength of the terminal device before the AP 3, that is, there may be a specific time interval of times for obtaining the signal strength of the terminal device by the plurality of neighboring APs, and the time interval may be measurement duration of the terminal device on each channel. Certainly, because a time required by each AP to measure the signal strength of the terminal device is different, the time interval may also be another value, and the time interval is not limited herein.

S206. The neighboring access point sends, to the control device, a signal used to indicate the signal strength of the terminal device, and the control device receives the signal.

In this embodiment of this application, the signal may include information such as the SNR or the RSSI of the terminal device.

S207. The control device determines an optimal roaming access point of the terminal device.

After receiving the signal that is used to indicate the signal strength of the terminal device and that is reported by the neighboring AP, the control device selects a neighboring AP corresponding to a maximum value of the signal strength of the terminal device as the optimal roaming access point of the terminal device. For example, an SNR that is of the signal of the terminal device and that is reported by the neighboring AP is used as the signal strength of the terminal device. For example, an SNR reported by the AP 2 is −40 dB, and an SNR reported by the AP 3 is −50 dB. Because −40 dB>−50 dB, the control device selects the AP 2 as the optimal roaming access point of the terminal device.

Certainly, the control device may alternatively comprehensively determine the optimal roaming access point of the terminal device with reference to other information of each neighboring AP. For example, the control device may further determine whether a bandwidth of the operating channel of each neighboring AP meets a requirement of the terminal device. For example, the terminal device requires an operating bandwidth of 80 megahertz (MHz), and the control device determines that a bandwidth of the operating channel of the AP 2 is 40 MHz and a bandwidth of the operating channel of the AP 3 is 160 MHz; and an SNR reported by the AP 3 is greater than signal strength of the terminal device when the terminal device roams, so that the control device can determine that the AP 3 is the optimal roaming access point of the terminal device. Certainly, the control device may alternatively determine the optimal roaming access point of the terminal device in another manner. This is not limited herein.

In the following description, an example in which the AP 2 is the optimal roaming access point of the terminal device is used for description.

S208. The control device sends a roaming access point indication to the associated access point, and the associated access point receives the roaming access point indication.

In this embodiment of this application, the roaming access point indication is used to indicate the optimal roaming access point of the terminal device. Specifically, the roaming access point indication may carry an identifier of the optimal roaming access point and/or an identifier of an operating channel of the optimal roaming access point.

It should be noted that the roaming access point indication may further implicitly indicate a roaming mode of the terminal device. In this embodiment of this application, the roaming mode may be divided into a channel switch announcement (CSA) manner and a basic service set transition management (BSS transition management, BTM) manner. The CSA manner is used to indicate that when an operating channel associated with the terminal device changes, and if the terminal device is instructed to roam in the CSA manner, the identifier of the operating channel of the optimal roaming access point may be carried in the roaming access point indication, to instruct the terminal device to switch from a current operating channel to an indicated operating channel. The associated access point does not switch the operating channel, so the associated access point guides the terminal device to a device whose operating channel is a channel indicated by the CSA, that is, the optimal roaming access point. If the terminal device is instructed to roam in a BTM manner, the roaming access point indication may carry a BSSID of the optimal roaming access point and/or the identifier of the operating channel of the optimal roaming access point. For a meaning of the BTM manner, refer to section 4.3.18.3 of the institute of electrical and electronics engineers (IEEE) 802.11-2016 protocol, and details are not described herein.

S209. The associated access point sends a roaming instruction, and the terminal device receives the roaming instruction.

In this embodiment of this application, the roaming instruction is used to instruct the terminal device to attempt to roam to the optimal roaming access point.

After receiving the roaming access point indication sent by the control device, the AP 1 indicates the optimal roaming access point and the roaming mode indicated by the control device to the terminal device, and guides the terminal device to roam to the optimal roaming access point.

S210. The terminal device roams to the optimal roaming access point based on the roaming instruction.

Figure 5:
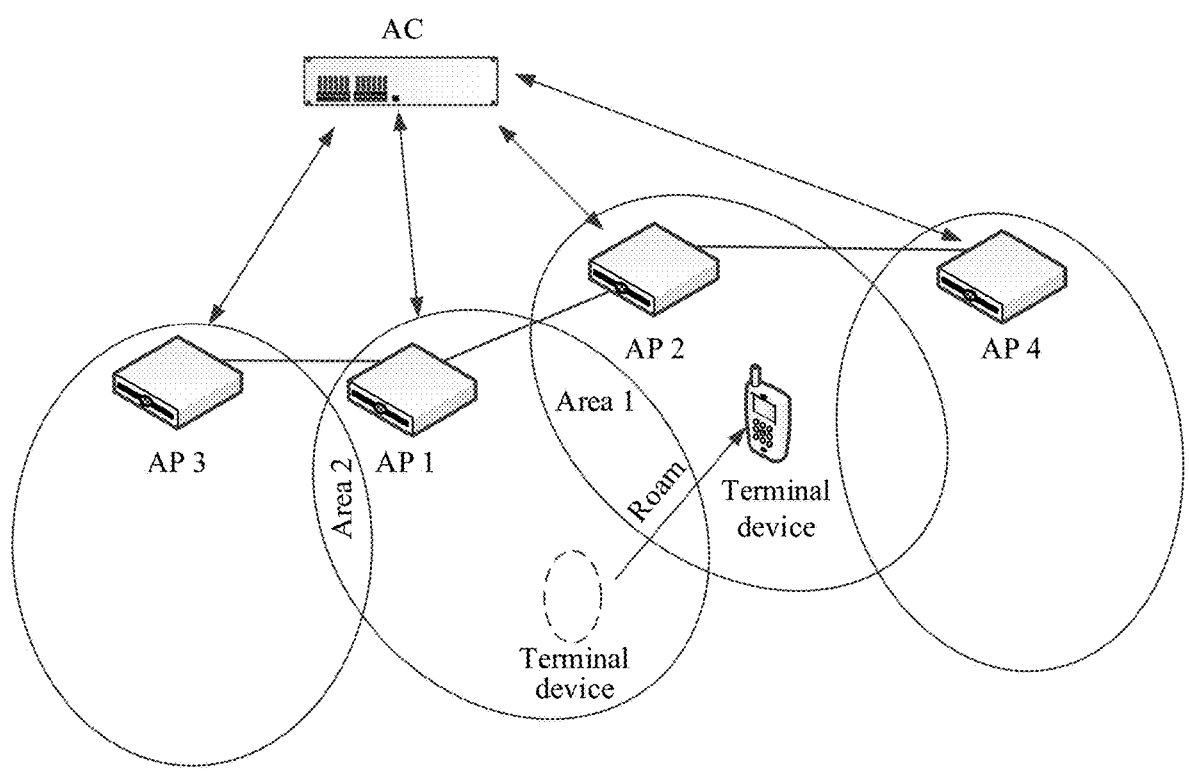
FIG. 5 is a schematic diagram in which a terminal device roams from an AP 1 to an AP 2 according to an embodiment of this application.

After receiving the roaming instruction sent by the AP 1, the terminal device may roam to the optimal roaming access point. For example, if the optimal roaming access point is the AP 2, the terminal device may send an access request to the AP 2. After the AP 2 allows the terminal device to access, and sends an access permission indication to the terminal device, the terminal device roams to the AP 2, as shown in FIG. 5.

Certainly, after receiving the roaming instruction, the terminal device may choose not to perform roaming, and whether roaming occurs may be determined based on a roaming policy set by the terminal device. An example in which the terminal device roams to the optimal roaming access point based on the roaming instruction is used in FIG. 2.

In the foregoing technical solutions, when determining that the terminal device reaches the roaming condition but does not roam, the associated access point notifies the neighboring access point of measuring the signal strength of the terminal device, and reports the measurement result to the control device. Therefore, the control device selects the optimal roaming access point for the terminal device, and guides the terminal device to roam to the optimal roaming access point, so that duration required by the terminal device to detect the optimal roaming AP in the current environment can be reduced, a probability of data loss of the terminal device in the roaming process can be reduced, and a roaming effect of the terminal device in a wireless local area network is improved.

In the foregoing embodiments provided in this application, the method provided in the embodiments of this application is described separately from perspectives of the associated access point, the neighboring access point, the control device, the terminal, and interaction between the associated access point, the neighboring access point, the control device, and the terminal. To implement the functions in the method provided in the foregoing embodiments of this application, the associated access point, the neighboring access point, the control device, and the terminal may include a hardware structure and/or a software module, to implement the foregoing functions in a form of the hardware structure, the software module, or a combination of the hardware structure and the software module. Whether a function in the foregoing functions is performed in a manner of the hardware structure, the software module, or a combination of the hardware structure and the software module depends on a specific application and a design constraint condition of the technical solutions.

Figure 6:
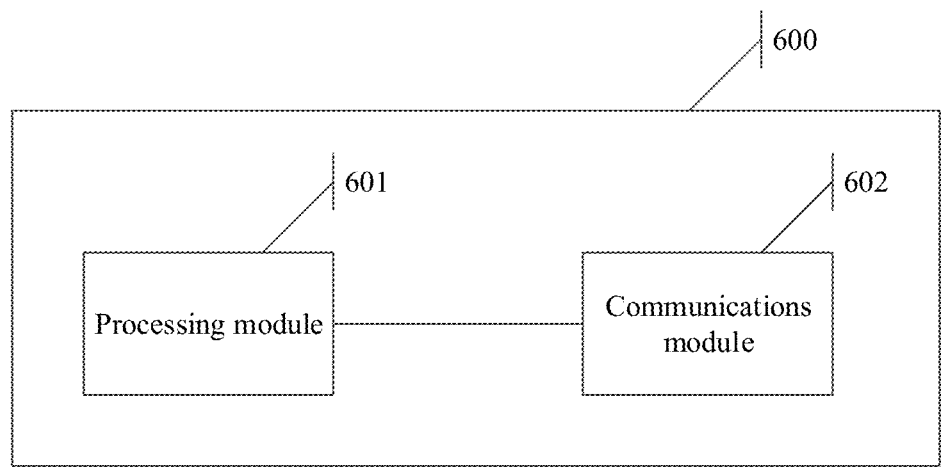
FIG. 6 is a schematic diagram of an example of a communications apparatus according to an embodiment of this application.

FIG. 6 is a schematic structural diagram of a communications apparatus 600. The communications apparatus 600 may be an associated access point, and can implement functions of the associated access point in the method provided in the embodiments of this application. Alternatively, the communications apparatus 600 may be an apparatus that can support the associated access point in implementing the functions of the associated access point in the method provided in the embodiments of this application. The communications apparatus 600 may be a hardware structure, a software module, or a combination of the hardware structure and the software module. The communications apparatus 600 may be implemented by a chip system. In this embodiment of this application, the chip system may include a chip, or may include a chip and another discrete component.

The communications apparatus 600 may include a processing module 601 and a communications module 602.

The processing module 601 may be configured to perform step S201 in the embodiment shown in FIG. 2, and/or configured to support another process of the technology described in this specification. The communications module 602 is configured to implement communication between the communications apparatus 600 and another module. The communications module 602 may be a circuit, a component, an interface, a bus, a software module, a transceiver, or any other apparatus that can implement communication.

The communications module 602 may be configured to perform step S202, step S203, step S208 and step S209 in the embodiment shown in FIG. 2, and/or configured to support another process of the technology described in this specification.

All related content of the steps in the foregoing method embodiment may be cited in function descriptions of corresponding function modules, and details are not described herein again.

Figure 7:
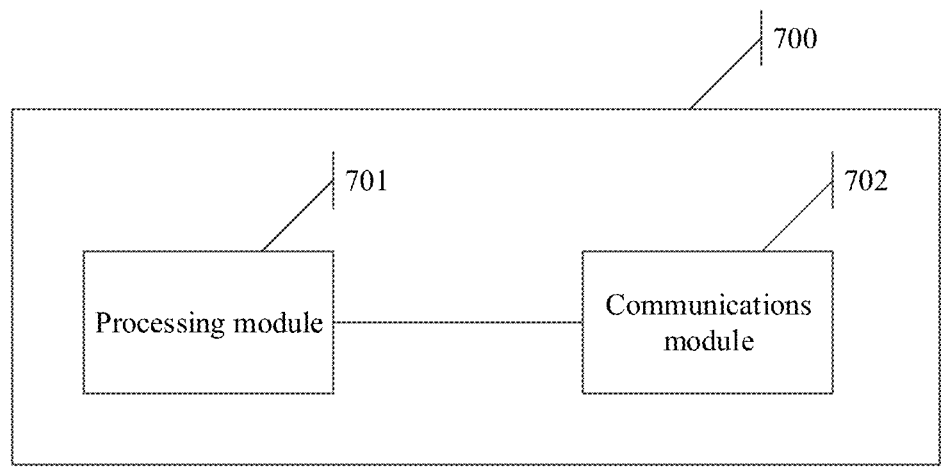
FIG. 7 is a schematic diagram of another example of a communications apparatus according to an embodiment of this application.

FIG. 7 is a schematic structural diagram of a communications apparatus 700. The communications apparatus 700 may be a control device, and can implement functions of the control device in the method provided in the embodiments of this application. Alternatively, the communications apparatus 700 may be an apparatus that can support the control device in implementing the functions of the control device in the method provided in the embodiments of this application. The communications apparatus 700 may be a hardware structure, a software module, or a combination of the hardware structure and the software module. The communications apparatus 700 may be implemented by a chip system. In this embodiment of this application, the chip system may include a chip, or may include a chip and another discrete component.

The communications apparatus 700 may include a processing module 701 and a communications module 702.

The processing module 701 may be configured to perform step S207 in the embodiment shown in FIG. 2, and/or configured to support another process of the technology described in this specification.

The communications module 702 may be configured to perform step S206 and step S208 in the embodiment shown in FIG. 2, and/or configured to support another process of the technology described in this specification. The communications module 702 is configured to implement communication between the communications apparatus 700 and another module. The communications module 702 may be a circuit, a component, an interface, a bus, a software module, a transceiver, or any other apparatus that can implement communication.

All related content of the steps in the foregoing method embodiment may be cited in function descriptions of corresponding function modules, and details are not described herein again.

In this embodiment of this application, module division is an example, and is merely logical function division and may be another division manner in actual implementation. In addition, function modules in the embodiments of this application may be integrated into one processor, or each of the modules may exist alone physically, or at least two modules may be integrated into one module. The integrated module may be implemented in a form of hardware, or may be implemented in a form of a software function module.

Figure 8:
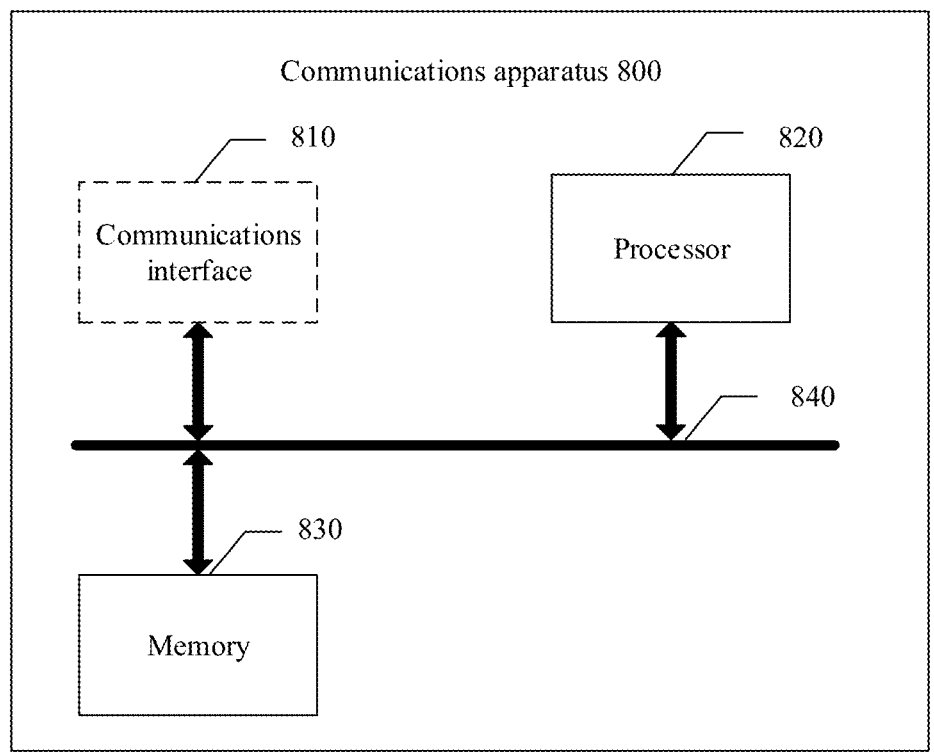
FIG. 8 is a schematic diagram of another example of a communications apparatus according to an embodiment of this application.

FIG. 8 shows a communications apparatus 800 according to an embodiment of this application. The communications apparatus 800 may be the associated access point shown in FIG. 2, and can implement functions of the associated access point in the method provided in the embodiments of this application. Alternatively, the communications apparatus 800 may be an apparatus that can support the associated access point in implementing the functions of the associated access point in the method provided in the embodiments of this application. The communications apparatus 800 may be a chip system. In this embodiment of this application, the chip system may include a chip, or may include a chip and another discrete component.

The communications apparatus 800 includes at least one processor 820, configured to implement or support the communications apparatus 800 in implementing the functions of the associated access point in the method provided in the embodiments of this application. For example, the processor 820 may determine that the terminal device meets the roaming condition. For details, refer to detailed descriptions in the method example, and details are not described herein again.

The communications apparatus 800 may further include at least one memory 830, configured to store a program instruction and/or data. The memory 830 is coupled to the processor 820. Couplings in this embodiment of this application are indirect couplings or communication connections between apparatuses, units, or modules, may be electrical, mechanical, or another form, and are used for information interaction between the apparatuses, the units, and the modules. The processor 820 may operate with the memory 830 together. The processor 820 may execute the program instruction stored in the memory 830. At least one of the at least one memory may be included in the processor.

The communications apparatus 800 may further include a communications interface 810, configured to communicate with another device through a transmission medium, so that an apparatus in the communications apparatus 800 can communicate with the another device. For example, the another device may be a control device. The processor 820 may send and receive data by using the communications interface 810.

In this embodiment of this application, a specific connection medium between the communications interface 810, the processor 820, and the memory 830 is not limited. In this embodiment of this application, the memory 830, the processor 820, and the communications interface 810 are connected by using a bus 840 in FIG. 8, where the bus is represented by a bold line in FIG. 8. A connection mode between other components is schematically described, and is not limited herein. The bus may be classified into an address bus, a data bus, a control bus, or the like. For ease of representation, the bus is represented by using only one bold line in FIG. 8. However, it does not mean that there is only one bus or only one type of bus.

In this embodiment of this application, the processor 820 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps in the method disclosed with reference to the embodiments of this application may be directly performed by a hardware processor, or may be performed by using a combination of hardware and software modules in the processor.

In this embodiment of this application, the memory 830 may be a non-volatile memory such as a hard disk drive (HDD) or a solid-state drive (SSD), or may be a volatile memory such as a random-access memory (RAM). The memory is any other medium that can be used to carry or store expected program code in a form of an instruction or a data structure and that is accessible to a computer, but is not limited thereto. The memory in this embodiment of this application may alternatively be a circuit or any other apparatus that can implement a storage function, and is configured to store a program instruction and/or data.

Figure 9:
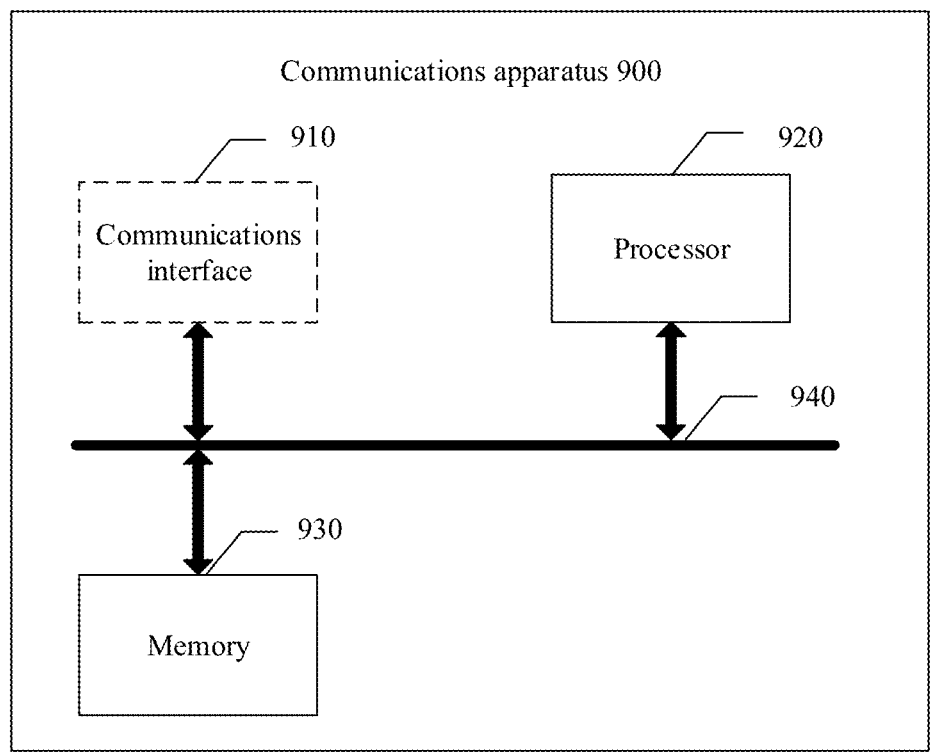
FIG. 9 is a schematic diagram of another example of a communications apparatus according to an embodiment of this application.

FIG. 9 shows a communications apparatus 900 according to an embodiment of this application. The communications apparatus 900 may be a control device, and can implement functions of the control device in the method provided in the embodiments of this application. Alternatively, the communications apparatus 900 may be an apparatus that can support the control device in implementing the functions of the control device in the method provided in the embodiments of this application. The communications apparatus 900 may be a chip system. In this embodiment of this application, the chip system may include a chip, or may include a chip and another discrete component.

The communications apparatus 900 includes at least one processor 920, configured to implement or support the communications apparatus 900 in implementing the functions of the control device in the method provided in the embodiments of this application. For example, the processor 920 may determine an optimal roaming access point of a terminal device. For details, refer to detailed descriptions in the method example, and details are not described herein again.

The communications apparatus 900 may further include at least one memory 930, configured to store a program instruction and/or data. The memory 930 is coupled to the processor 920. Couplings in this embodiment of this application are indirect couplings or communication connections between apparatuses, units, or modules, may be electrical, mechanical, or another form, and are used for information interaction between the apparatuses, the units, and the modules. The processor 920 may operate with the memory 930 together. The processor 920 may execute the program instruction stored in the memory 930. At least one of the at least one memory may be included in the processor.

The communications apparatus 900 may further include a communications interface 910, configured to communicate with another device through a transmission medium, so that an apparatus in the apparatus 900 can communicate with the another device. For example, the another device is an associated access point. The processor 920 may send and receive data by using the communications interface 910.

In this embodiment of this application, a specific connection medium between the communications interface 910, the processor 920, and the memory 930 is not limited. In this embodiment of this application, the memory 930, the processor 920, and the communications interface 910 are connected by using a bus 940 in FIG. 9, where the bus is represented by a bold line in FIG. 9. A connection mode between other components is schematically described, and is not limited herein. The bus may be classified into an address bus, a data bus, a control bus, or the like. For ease of representation, the bus is represented by using only one bold line in FIG. 9. However, it does not mean that there is only one bus or only one type of bus.

In this embodiment of this application, the processor 920 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps in the method disclosed with reference to the embodiments of this application may be directly performed by a hardware processor, or may be performed by using a combination of hardware and software modules in the processor.

In this embodiment of this application, the memory 930 may be a non-volatile memory such as a hard disk drive (HDD) or a solid-state drive (SSD), or may be a volatile memory such as a random-access memory (RAM). The memory is any other medium that can be used to carry or store expected program code in a form of an instruction or a data structure and that is accessible to a computer, but is not limited thereto. The memory in this embodiment of this application may alternatively be a circuit or any other apparatus that can implement a storage function, and is configured to store a program instruction and/or data.

An embodiment of this application further provides a computer-readable storage medium including an instruction. When the instruction is run on a computer, the computer is enabled to perform the method implemented by the associated access point in the embodiment shown in FIG. 2.

An embodiment of this application further provides a computer-readable storage medium including an instruction. When the instruction is run on a computer, the computer is enabled to perform the method implemented by the control device in the embodiment shown in FIG. 2.

An embodiment of this application further provides a computer program product including an instruction. When the computer program product is run on a computer, the computer is enabled to perform the method implemented by the associated access point in the embodiment shown in FIG. 2.

An embodiment of this application further provides a computer program product including an instruction. When the computer program product is run on a computer, the computer is enabled to perform the method implemented by the control device in the embodiment shown in FIG. 2.

An embodiment of this application provides a chip system. The chip system includes a processor, may further include a memory, and is configured to implement functions of the associated access point in the foregoing method. The chip system may include a chip, or may include a chip and another discrete component.

An embodiment of this application provides a chip system. The chip system includes a processor, may further include a memory, and is configured to implement functions of the control device in the foregoing method. The chip system may include a chip, or may include a chip and another discrete component.

An embodiment of this application provides a system, and the system includes the foregoing associated access point and the foregoing control device.

All or some of the method in the embodiments of this application may be implemented by using software, hardware, firmware, or any combination thereof. When the embodiments are implemented by using software or firmware, all or some of the embodiments may be implemented in a form of a computer program product. The computer program product includes one or more computer instructions. When the computer program instruction is loaded and executed on a computer, the procedure or function according to the embodiments of the present invention are completely or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

Clearly, a person skilled in the art may make various modifications and variations to this application without departing from the scope of this application. This application is intended to cover these modifications and variations provided that they fall within the scope of protection defined by the claims of this application and their equivalent technologies.

What is claimed is:

1. A wireless local area network roaming method, comprising:
    sending, by an associated access point, a measurement instruction to a neighboring access point, wherein the measurement instruction comprises an identifier of a terminal device, the measurement instruction is used to instruct the neighboring access point to send a measured signal strength of the terminal device to a control device, and the associated access point is an access point associated with the terminal device, wherein the measurement instruction is used to instruct the neighboring access point to send the measured signal strength of the terminal device to the control device within a preset time period in response to a frequency of an operating channel of the associated access point not being the same as a frequency of an operating channel of the neighboring access point;
    sending, by the associated access point, a beacon request while sending the measurement instruction in response to a frequency of an operating channel of the associated access point not being the same as a frequency of an operating channel of the neighboring access point, wherein a receiver address of the beacon request is an address of the terminal device, and wherein a value of a measurement mode field of the beacon request is active;
    receiving, by the associated access point, a roaming access point indication sent by the control device, wherein the roaming access point indication is used to indicate an optimal roaming access point of the terminal device, and the optimal roaming access point is determined based on the measured signal strength of the terminal device that is sent by the neighboring access point to the control device, wherein the associated access point is implemented in a device other than the control device and wherein the neighboring access point is implemented in a device other than the control device; and
    sending, by the associated access point, a roaming instruction, wherein the roaming instruction is used to instruct the terminal device to attempt to roam to the optimal roaming access point.

2. The method according to claim 1, wherein the associated access point repeatedly sends the beacon request, and a lower signal strength of the terminal device indicates more frequent sending of the beacon request by the associated access point.

3. The method according to claim 1, wherein the beacon request comprises a channel list field, wherein the channel list field comprises only an operating channel of the neighboring access point.

4. The method according to claim 1, wherein the roaming access point indication carries one or both of an identifier of the optimal roaming access point and an identifier of an operating channel of the optimal roaming access point.

5. A wireless local area network roaming method, comprising:
- receiving, by a control device, a signal strength of a terminal device that is sent by a neighboring access point within a preset time period based on a measurement instruction and a beacon request from an associated access point in response to a frequency of an operating channel of the associated access point not being the same as a frequency of an operating channel of the neighboring access point, wherein a receiver address of the beacon request is an address of the terminal device, and wherein a value of a measurement mode field of the beacon request is active;
- determining, by the control device, an optimal roaming access point of the terminal device based on the signal strength of the terminal device; and
- sending, by the control device, a roaming access point indication to the associated access point, wherein the roaming access point indication is used to indicate the optimal roaming access point, and the associated access point is an access point associated with the terminal device, wherein the associated access point is implemented in a device other than the control device and wherein the neighboring access point is implemented in a device other than the control device.

6. The method according to claim 5, wherein the roaming access point indication carries one or both of an identifier of the optimal roaming access point and an identifier of an operating channel of the optimal roaming access point.

7. A communications apparatus, comprising a processor and a transceiver, wherein the communications apparatus is an associated access point,
- the transceiver is configured to send, under control of the processor, a measurement instruction to a neighboring access point, wherein the measurement instruction comprises an identifier of a terminal device, the measurement instruction is used to instruct the neighboring access point to send a measured signal strength of the terminal device to a control device, and the associated access point is an access point associated with the terminal device, wherein the measurement instruction is used to instruct the neighboring access point to send the measured signal strength of the terminal device to the control device within a preset time period in response to a frequency of an operating channel of the associated access point not being the same as a frequency of an operating channel of the neighboring access point;
- the transceiver is configured to send, under control of the processor, a beacon request while sending the measurement instruction in response to a frequency of an operating channel of the associated access point not being the same as a frequency of an operating channel of the neighboring access point, wherein a receiver address of the beacon request is an address of the terminal device, and wherein a value of a measurement mode field of the beacon request is active;
- the transceiver is configured to receive, under control of the processor, a roaming access point indication sent by the control device, wherein the roaming access point indication is used to indicate an optimal roaming access point of the terminal device, and the optimal roaming access point is determined based on the measured signal strength of the terminal device that is sent by the neighboring access point to the control device, wherein the associated access point is implemented in a device other than the control device and wherein the neighboring access point is implemented in a device other than the control device; and
- the transceiver is configured to send, under control of the processor, a roaming instruction, wherein the roaming instruction is used to instruct the terminal device to attempt to roam to the optimal roaming access point.

8. The apparatus according to claim 7, wherein the transceiver is configured to repeatedly send, under control of the processor, the beacon request, and a lower signal strength of the terminal device indicates more frequent sending of the beacon request by the associated access point.

9. The apparatus according to claim 7, wherein the beacon request comprises a channel list field, wherein the channel list field comprises only an operating channel of the neighboring access point.

10. The apparatus according to claim 7, wherein the roaming access point indication carries one or both of an identifier of the optimal roaming access point and an identifier of an operating channel of the optimal roaming access point.

* * * * *